Patented Sept. 26, 1939

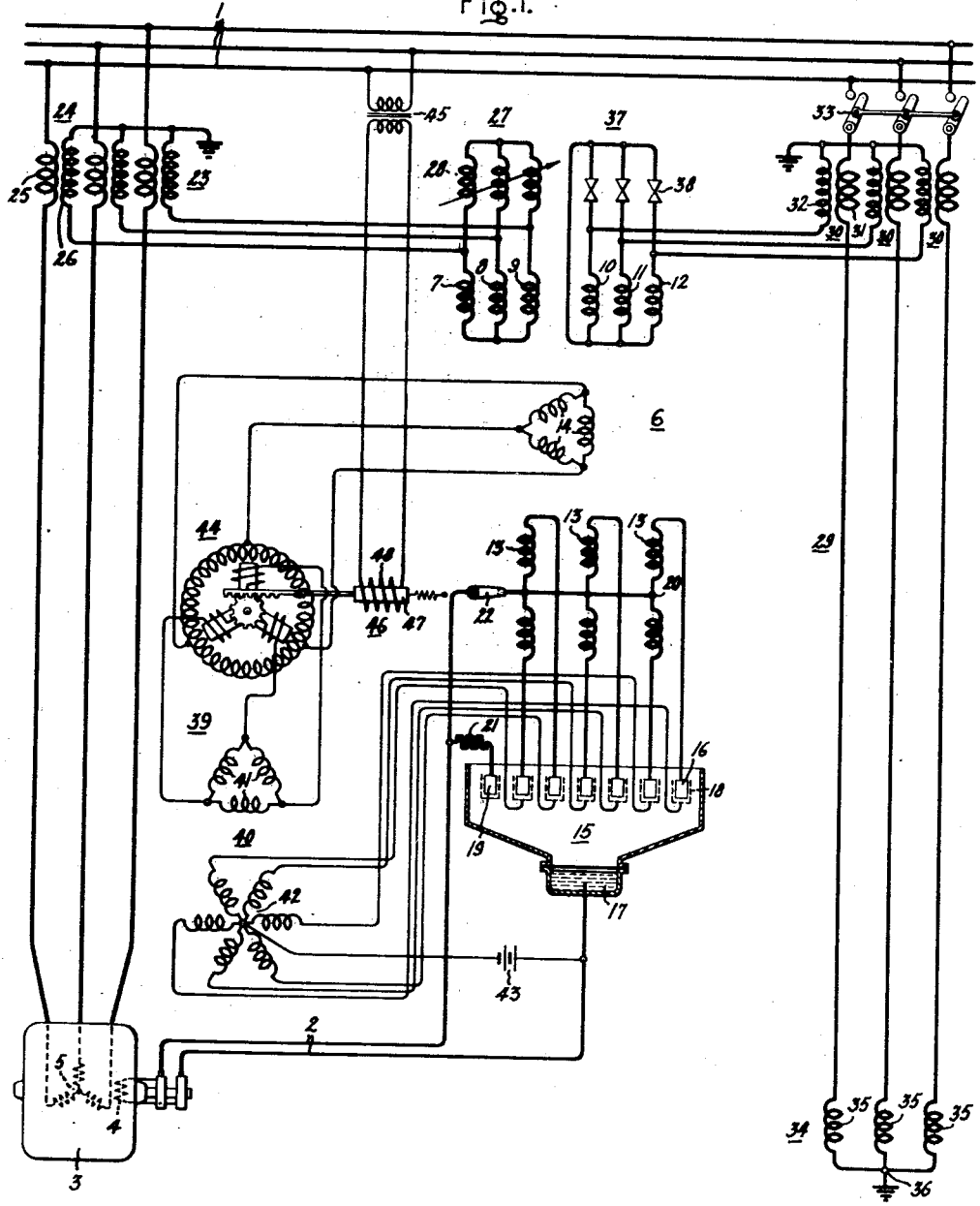

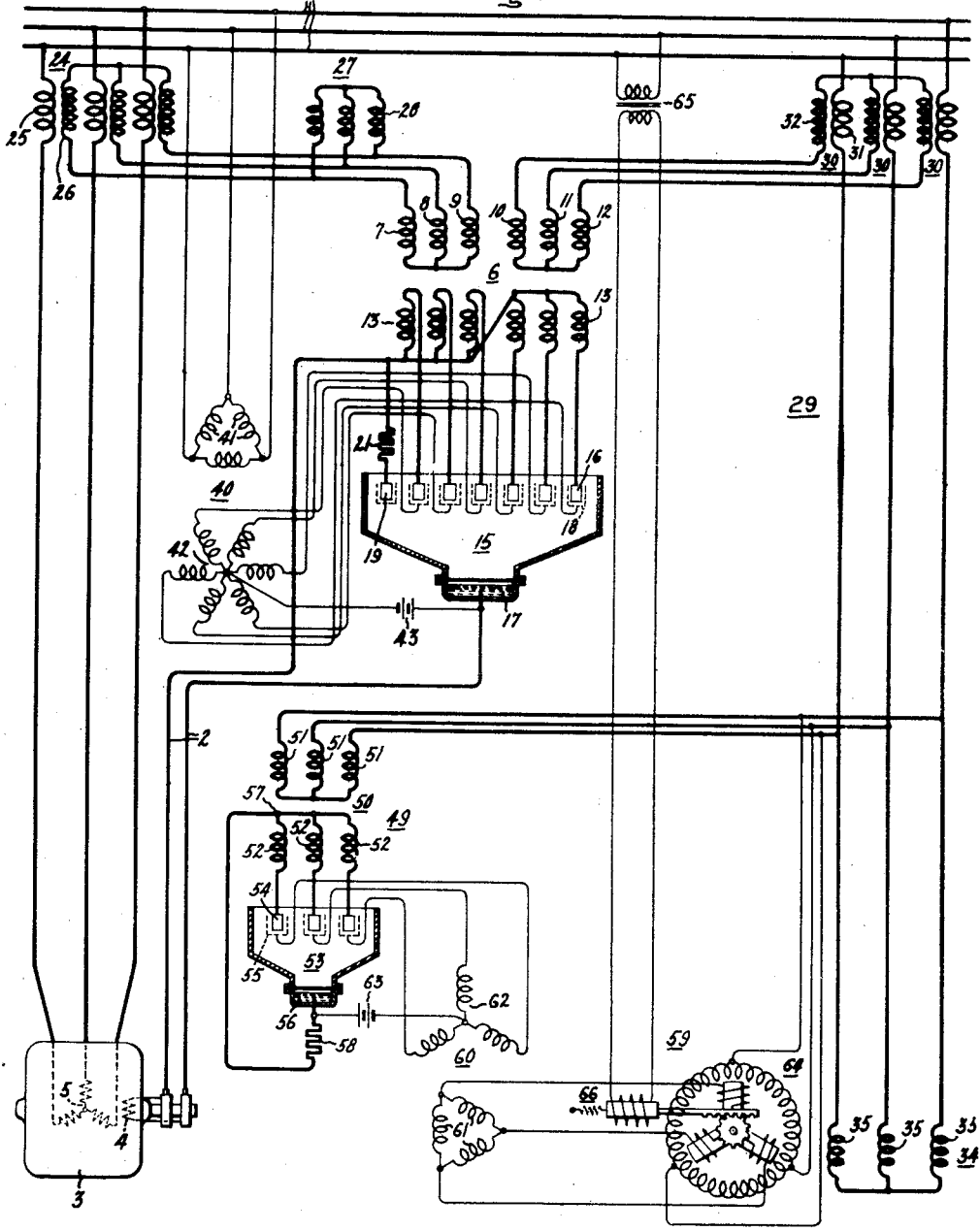

2,174,392

UNITED STATES PATENT OFFICE 2,174,392

ELECTRIC TRANSLATING SYSTEM

Karl Schmer, Berlin-Mariendorf, and Richard Troeger, Berlin-Zehlendorf, Germany, assignors to General Electric Company, a corporation of New York Application April 7, 1937, Serial No. 135,580
In Germany April 22, 1936

16 Claims. (Cl. 175—363)

Our invention relates to electric translating systems and more particularly to electric valve translating systems for controlling dynamo-electric machines.

Heretofore there have been devised numerous electric valve translating systems for transmitting energy between alternating current and direct current circuits in accordance with certain predetermined conditions. For example, electric valve translating systems have been employed to energize the field circuits of dynamo-electric machines of the synchronous type and in some of these arrangements there have been provided circuits for increasing the energization of the field winding upon increase of load. One of the most desirable arrangements for increasing the field excitation upon increase of load current is that employing inductive devices, such as current transformers, energized by the armature current of the machine to introduce in the field circuit a component of current to meet the increased load requirement. However, where this kind of arrangement has been employed to increase the field current by increasing the anode-cathode current of controlled electric valve means, it has usually resulted in a sacrifice of control of the discharge paths during the intervals in which increased current has prevailed. Therefore, it has become desirable to provide an improved electric valve translating means to increase the anode-cathode current of controlled electric valve means without sacrificing the highly desirable feature of controlling the conductivities of the associated discharge paths during transient conditions so that it is possible to maintain a predetermined electrical or operating characteristic of a machine or a circuit.

It is an object of our invention to provide a new and improved electric translating system.

It is another object of our invention to provide a new and improved electric valve translating system for transmitting energy between alternating current and direct current circuits.

It is a further object of our invention to provide a new and improved electric valve control or excitation system for dynamo-electric machines of the synchronous type.

It is a still further object of our invention to provide a new and improved control system for electronic discharge apparatus.

In accordance with one of the illustrated embodiments of our invention, the energization of a direct current circuit, such as the field circuit of a dynamo-electric machine of the synchronous type, is controlled in accordance with the current of an associated alternating current circuit or in accordance with the load or armature current of the machine through controlled electronic discharge means. An inductive network, such as a multi-winding transformer, is associated with the electronic discharge means. An alternating voltage derived from a circuit associated with the alternating current circuit is impressed on the primary windings of the transformer to energize the electronic discharge means to supply unidirectional current to the field winding, and a current responsive circuit is associated with the armature circuit of the dynamo-electric machine to provide a voltage which varies in accordance with the current of the machine. This latter voltage is also impressed on the primary windings of the transformer to supply to the field winding of the machine a component of unidirectional current which varies in accordance with the armature current. An impedance network is connected in parallel with the primary windings of the transformer to control or limit the voltages impressed thereon during transient conditions to permit uninterrupted control of the discharge paths of the electronic discharge means during such transient conditions. In accordance with another illustrated embodiment of our invention, an auxiliary circuit is provided to control the voltage impressed on the anodes of the electronic discharge means. This circuit includes an auxiliary electronic discharge device for controlling the voltage impressed on the primary windings of the main transformer in accordance with a predetermined electrical condition of the associated dynamo-electric machine or in accordance with a predetermined electrical condition of the associated alternating current circuit.

For a better understanding of our invention, reference may be had to the following description taken in connection with the accompanying drawings and its scope will be pointed out in the appended claims. Figs. 1 and 2 diagrammatically show embodiments of our invention as applied to electric valve translating systems for controlling the energization of the field winding of a dynamo-electric machine of the synchronous type.

In Fig. 1 of the accompanying drawings our invention is diagrammatically shown as applied to an electric valve translating system for transmitting energy between an alternating current circuit 1 and a direct current load circuit 2. In this particular arrangement, we have chosen to represent our invention as applied to a system for controlling the energization of a field circuit of a dynamo-electric machine 3 of the synchronous type having a field winding 4 and armature windings 5.

The field winding 4 of the machine 3 is energized from the alternating current circuit 1 or from the armature windings 5 of machine 3 through an inductive network such as a transformer 6 having one group of primary windings 7, 8 and 9 and a second group of primary windings 10, 11 and 12, a plurality of secondary windings 13 and a plurality of tertiary windings 14. An electronic discharge means 15 is energized in accordance with the voltage of the secondary windings 13 of transformer 6 to supply unidirectional current to field winding 4 of machine 3 through the direct current circuit 2. The electronic discharge means 15 is preferably of the type employing an ionizable medium and in the drawings is represented as comprising a plurality of anodes 16, a mercury pool cathode 17 and control members 18, each associated with a predetermined different one of the anodes 16 for controlling the conductivity of the associated discharge path. The electronic discharge means 15 may, if desired, have an anode 19 which is connected to a neutral connection 20 of secondary windings 13 of transformer 6 through a current limiting resistance 21 and a switch 22. While for the purpose of explaining our invention we have chosen to represent the electronic discharge means 15 as of the type including a plurality of anodes and a single cathode within an enclosing receptacle, it is to be understood that we may employ a plurality of electronic discharge devices of the type in which a single anode, a cathode and an associated control member are enclosed within a receptacle.

A current responsive circuit 23 is employed to energize the transformer 6 in accordance with the current of the armature windings of machine 3 or in accordance with the current of the alternating current circuit 1. The current responsive circuit 23 includes a plurality of inductive devices, such as current transformers 24, each being provided with a primary winding 25 which is energized in accordance with the current of the armature windings 5 and a secondary winding 26 which supplies an alternating voltage which varies in accordance with the alternating current of the armature windings 5. The lower terminals of the secondary windings 26 of current transformers 24 are connected to primary windings 7, 8 and 9 of transformer 6 and the upper terminals are shown as being connected to ground. Connected in series relation with the secondary windings 26 of current transformers 24, we provide an impedance network 27 to control the voltages impressed on primary windings 7, 8 and 9 of transformer 6. The impedance network 27 may include impedance elements, such as resistances, capacitances or inductances of either fixed or adjustable arrangements and in the particular arrangement shown in Fig. 1 the impedance network 27 has been shown as comprising adjustable inductances 28. Although nonreactive impedance elements may be employed in the network 27, reactive impedance elements or energy storage devices, such as capacitances and inductances, have been found to perform this function very satisfactorily.

A circuit 29 is provided to impress on primary windings 10, 11 and 12 of transformer 6 a suitable alternating voltage of either fixed or variable magnitude. The circuit 29 may include a plurality of inductive devices, such as transformers 30, having primary windings 31 and secondary windings 32 connected to primary windings 10, 11 and 12 of transformer 6. The secondary windings 32 may also be arranged to have one terminal thereof grounded. The primary windings of transformers 30 may be connected to the alternating current circuit 1 through any conventional circuit controlling means such as a switch 33. A network 34, including a plurality of impedance elements such as inductive reactances 35 arranged in a Y-connection and in series relation with primary windings 31 of transformers 30, is employed to control the voltage appearing across the terminals of primary windings 31. A neutral connection 36 of the inductive reactance 35 may be connected to ground.

In order to limit the voltage impressed on primary windings 10, 11 and 12 of transformer 6, we provide a network 37 including a plurality of voltage limiting devices 38 which are arranged in a Y-connection and connected across the terminals of the primary windings 10, 11 and 12. The devices 38 may be any of the well known overvoltage protective devices.

We provide a control or excitation circuit 39 which is energized from the tertiary winding 14 of transformer 6 for controlling the phase of the voltages impressed on control members 18 of electronic discharge means 15 in accordance with a predetermined electrical condition of the alternating current circuit 1 or in accordance with a predetermined electrical or operating condition of the dynamo-electric machine 3. The control circuit 39 may comprise a transformer 40 having primary windings 41 and secondary windings 42 for supplying alternating voltages which are impressed on control members 18 of electronic discharge means 15. A suitable source of negative biasing potential, such as a battery 43, is connected between a neutral connection of secondary windings 42 and cathode 17. In order to control the phase of the alternating voltages supplied by the secondary windings 42 of transformer 40, we may employ an arrangement comprising any conventional phase shifting device such as a rotary phase shifter 44 energized from the tertiary windings 14 of transformer 6. It is to be understood that any other suitable arrangement, such as impedance phase shifting networks or the like, may be employed to control the phase of the periodic voltages provided by the tertiary windings 14 of transformer 6. The phase of the alternating voltages impressed on control members 18 may be controlled in accordance with a predetermined electrical condition, such as the voltage, of the alternating current circuit 1 by any suitable agency such as a transformer 45 and an actuating means 46 including a plunger or core member 47 and an associated actuating coil 48.

The general principles of operation of the embodiment of our invention diagrammatically shown in Fig. 1 will be explained by considering the system when the dynamo-electric machine 3 is operating as a synchronous generator to supply alternating current to the alternating current circuit 1 through the current transformers 24. Let it be assumed that the switch 33 is in the closed circuit position and furthermore let it be assumed that the rotary phase shifting device 44 is adjusted so that the conductivities of the discharge paths of electric valve means 15 are controlled to energize the field winding 4 of machine 3 in accordance with the voltage of the alternating current circuit 1. As will be well understood by those skilled in the art, the voltage impressed on the direct current circuit 2 for a given value of anode voltage will be maximum when there is substantial phase coincidence between the voltages impressed on the anodes and the voltages impressed on the associated control members, and the voltage impressed on the load circuit 2 will be substantially zero when there is substantial phase opposition between these voltages. For intermediate values the voltage impressed on the direct current circuit 2 will, of course, assume corresponding intermediate values. Of course, as the voltage impressed on the anode 16 of electronic discharge means 15 increases for a given phase displacement between the voltage impressed on the anodes and the voltage impressed on the associated control members the anode-cathode current will increase a corresponding amount. The secondary windings 26 of current transformers 24 will impress on the primary windings 7, 8 and 9 of transformer 6 alternating voltages which vary in accordance with the armature current of machine 3 to impress on the anodes 16 of electronic discharge means 15 a voltage which varies in accordance with the alternating current. During normal operation it will be understood that the system including the electronic discharge means 15 will supply unidirectional current to the field winding 4 of machine 3 through circuit 2 one component of which is substantially fixed in magnitude and a second component of unidirectional current which varies in accordance with the current of the alternating current circuit 1 or in accordance with the current of the armature winding 5 of machine 3. The former component of current will be provided by way of transformers 30 and the latter component of current will be supplied by current transformers 24.

If it be assumed that the armature current of the machine 3 increases very rapidly there will be induced in secondary windings 26 of current transformers 24 a corresponding voltage to increase the voltage impressed on primary windings 7, 8 and 9 of transformer 6, effecting thereby an increase in the current supplied to the field winding 4. However, due to the network 27 connected across primary windings 7, 8 and 9, this increase of voltage will be maintained within a predetermined range of value so that the control members 18 of electronic discharge means 15 may continue to control the conductivities of the associated arc discharge paths to effect control of the energization of the field winding 5 in accordance with the voltage of alternating current circuit 1. In this manner the system permits the utilization of the increase in line or armature current to increase the energization of the field winding of the machine without sacrificing the control of the arc discharge paths of the electronic discharge means 15. In a similar manner, the overvoltage protective devices 38 of network 37 will respond to limit the maximum value of the voltages impressed on the primary windings 10, 11 and 12 by transformers 30.

Since the tertiary windings 14 of transformer 6 are inductively associated with the primary windings and the secondary windings thereof, it is to be understood that the control voltages provided by tertiary windings 14 and supplied to control members 18 through the phase shifter 44 and transformer 40 will be controlled in accordance with the current of the alternating current circuit 1 and in accordance with the voltage supplied by transformers 30.

Due to the fact that the inductive reactances 35 of network 34 are of relatively large value, the voltages impressed on primary windings 10, 11 and 12 of transformer 6 by secondary windings 32 of transformers 30 will remain substantially constant in value to assure a substantially constant source of voltage for energizing the transformer 6 and electronic discharge means 15.

Fig. 2 of the accompanying drawings diagrammatically shows another embodiment of our invention similar in many respects to that shown in Fig. 1, and corresponding elements have been assigned like reference numerals. The circuit 29 in the arrangement of Fig. 2 is provided with means, such as an auxiliary power or energy absorbing circuit 49, connected in parallel with inductive reactances 35 to control the impedance of the circuit 29 and hence to control the voltages impressed on primary windings 10, 11 and 12 of transformer 6 in accordance with a predetermined electrical condition such as the voltage of the alternating current circuit 1. The circuit 49 may comprise a transformer 50 having primary windings 51 and secondary windings 52, and an electronic discharge means 53. The electronic discharge means 53, preferably of the type employing an ionizable medium such as a gas or a vapor, may include a plurality of anodes 54 and associated control members 55, and a mercury pool cathode 56. The electronic discharge means 53 is associated with secondary windings 52 of transformer 50 to operate as a rectifier and the output circuit thereof is connected to a neutral connection 57 of secondary windings 52 and cathode 56 through a resistance 58. A control or excitation circuit 59 is employed to impress on control members 55 of electronic discharge means 53 alternating voltages variable in phase in accordance with a predetermined electrical condition of the alternating current circuit 1 or in accordance with a predetermined electrical or operating condition of the dynamo-electric machine 3. The excitation circuit 59 may include a transformer 60 having primary windings 61 and secondary windings 62 and may include any conventional source of negative unidirectional biasing potential such as a battery 63. To control the phase of the alternating voltages impressed on control members 55, we employ any suitable phase shifting arrangement, such as a rotary phase shifting device 64, which may be controlled in accordance with a predetermined electrical condition, such as the voltage of the alternating current circuit 1, through a transformer 65 and an actuating element 66. The rotary phase shifter 64 may be energized from the circuit 29, but it is to be understood that any suitable source of alternating current correlated in phase and frequency to the voltage of the alternating current circuit 1 or to the voltage of the circuit 29 may be employed.

The operation of the embodiment of our invention shown in Fig. 2 will be considered when the machine 3 is operating as a synchronous generator to supply energy to the alternating current circuit 1. The current transformers 24 will impress on primary windings 7, 8 and 9 of transformer 6 alternating voltages which vary in accordance with the armature current of machine 3 to transmit to the field winding 4 a component of unidirectional current which varies in accordance with the armature current. The transformers 30 of circuit 29 will impress on primary windings 10, 11 and 12 of transformer 6 alternating voltages which vary in accordance with the voltage appearing across the terminals of primary windings 31 of transformers 30. The voltage impressed across the terminals of the primary windings 31 of transformers 30 or in other words the current supplied to these windings is controlled in accordance with the voltage of the alternating current circuit 1 by circuit 49 including electronic discharge means 53 and the associated excitation circuit 59. As will be well understood by those skilled in the art, the current transmitted by the electronic discharge means 53 will be maximum when there is substantial phase coincidence between the voltages impressed on control members 55 and the voltages impressed on the associated anodes 54. By retarding the voltages impressed on control members 55 relative to the anode voltage, the conductivity of the electronic discharge means 53 and hence the current conducted thereby is decreased. By so controlling the conductivity of the electronic discharge means 53, the net or effective impedance of the circuit 29 is controlled to effect control of the voltage impressed across primary windings 31 of transformers 30 and to thereby control one component of unidirectional current which is supplied to the field circuit 4 of machine 3. For example, if the voltage of the alternating current circuit 1 or the voltage of the machine 3 increases to a value above a predetermined value, the actuating element 66 of excitation circuit 59 will operate the rotary phase shifter 64 to retard the voltages impressed on control members 55 to decrease the conductivity of the electronic discharge means 53 to effect a decrease in the voltages impressed on or the current supplied to primary windings 31 of transformers 30. In this manner, the voltages impressed on primary windings 10, 11 and 12 of transformer 6 will be decreased to effect a decrease in the unidirectional current supplied to field winding 4 of machine 3, tending to restore the terminal voltage of the machine to the predetermined value to be maintained. Conversely, if the voltage of the alternating current circuit 1 decreases to a value below the predetermined value, the voltages impressed on control members 55 will be advanced to increase the conductivity of the electronic discharge means 53 to effect an increase in the voltage appearing across the terminals of or the current supplied to primary windings 31 of transformers 30. Under these conditions, the voltages impressed on primary windings 10, 11 and 12 of transformer 6 will also be increased to increase the unidirectional current supplied by field winding 4 to restore the terminal voltage of the machine 3 to the predetermined value.

In the event a sudden load is applied to the alternating current circuit 1 to effect a very rapid increase in the armature current, the network 27 associated with primary windings 7, 8 and 9 of transformer 6 will absorb a sufficient amount of energy to permit the control of the discharge paths of electronic discharge means 56 by control members 18 during this transient condition. Under the above described conditions of operation, it will be understood that there are two components of unidirectional current supplied to field winding 4 of machine 3; one of these components of current is that controlled by current transformers 24 and the other is that controlled by transformers 30.

Some of the principal advantages of the embodiment of our invention shown in Fig. 2 are the facility and precision of control and apparatus economy effected by controlling the main electronic discharge means 15 through an auxiliary or control electronic discharge means 53 which may be of substantially smaller proportions than that of the other associated apparatus in the translating system.

While we have shown and described our invention as applied to a particular system of connections and as embodying various devices diagrammatically shown, it will be obvious to those skilled in the art that changes and modifications may be made without departing from our invention, and we, therefore, aim in the appended claims to cover all such changes and modifications as fall within the true spirit and scope of our invention.

What we claim as new and desire to secure by Letters Patent of the United States, is:

1. In combination, an alternating current circuit, a direct current circuit, an electronic discharge means connected to said direct current circuit and having a plurality of discharge paths and associated control members, means for providing an alternating voltage, current responsive means for providing a voltage which varies in accordance with the current of said alternating current circuit, an inductive network comprising primary windings energized by said first mentioned means and said current responsive means and having secondary windings connected to said electronic discharge means, means connected across said primary windings for controlling the voltage impressed on said primary windings, and a circuit for energizing said control members to control the conductivity of said discharge paths.

2. In combination, an alternating current circuit, a load circuit, an electronic discharge means connected to said load circuit and having a plurality of discharge paths and associated control members, means for providing an alternating voltage, current responsive means for providing a voltage which varies in accordance with the current of said alternating current circuit, an inductive network comprising primary windings energized by said first mentioned means and said current responsive means and having secondary windings connected to said electronic discharge means, an impedance network connected across said primary windings comprising a plurality of energy storage devices for controlling the voltage impressed on said primary windings during transient load conditions imposed on said alternating current circuit, and a control circuit for impressing on said control members alternating voltages to control the conductivities of said discharge paths.

3. In combination, an alternating current circuit, a load circuit, an electronic discharge means connected to said load circuit, means for providing a voltage of substantially constant value, current responsive means for providing a voltage which varies in accordance with the current of said alternating current circuit, an inductive network comprising primary windings energized by said first mentioned means and said current responsive means and having secondary windings connected to said electric valve means for supplying to said load circuit one component of unidirectional current of substantially constant value and another component of unidirectional current variable in accordance with the current of said alternating current circuit, and means connected in series relation with said current responsive means for controlling the voltage impressed on said primary windings.

4. In combination, an alternating current circuit, a direct current circuit, an electronic discharge means, means for providing an alternating voltage which is substantially constant in value, means for providing a voltage which varies in accordance with the current of said alternating current circuit, and an inductive network energized from said first mentioned and said second mentioned means for supplying to said direct current circuit through said electronic discharge means one component of unidirectional current of substantially constant value and another component of unidirectional current variable in accordance with the current of said alternating current circuit.

5. In combination, an alternating current circuit, a direct current circuit, an electronic discharge means including a plurality of discharge paths, means connected to said alternating current circuit for providing an alternating voltage of substantially constant value, current responsive means for providing an alternating voltage which varies in accordance with the current of said alternating current circuit, an inductive network comprising primary windings energized by said first mentioned means and said current responsive means and secondary windings associated with said discharge paths for controlling the voltage impressed thereon to supply to said direct current circuit one component of unidirectional current of substantially constant value and another component of current variable in accordance with the current of said alternating current circuit.

6. In combination, an alternating current circuit, a direct current circuit, an electronic discharge means for energizing said direct current circuit and including a plurality of discharge paths each having an associated anode and a control member for controlling the conductivity thereof, means for providing an alternating voltage of substantially constant value, means for providing a voltage which varies in accordance with current of said alternating current circuit, an inductive network comprising one group of primary windings energized from said first mentioned means, a second group of primary windings energized from said current responsive means, a plurality of secondary windings connected to said anodes to control the voltage impressed on said anodes and tertiary windings inductively associated with said primary and said secondary windings for providing a periodic control voltage, and a control circuit connected to said tertiary windings for energizing said control members and comprising means for controlling the phase of said periodic voltages relative to the voltages impressed on the associated anodes in accordance with a predetermined electrical condition of said alternating current circuit.

7. In combination, an alternating current circuit, a direct current circuit, electronic discharge means connected to said direct current circuit and having a plurality of discharge paths and associated control members, means for providing an alternating voltage, current responsive means for providing a voltage which varies in accordance with the current of said alternating current circuit, an inductive network comprising primary windings energized by said first mentioned means and said current responsive means, secondary windings connected to said electronic discharge means and tertiary windings inductively associated with said primary windings and said secondary windings, and a control circuit energized by said tertiary windings for providing periodic control voltages for energizing said control members to control the conductivities of said discharge paths.

8. In combination, a supply circuit, a load circuit, electronic discharge means interconnecting said circuits for transmitting energy therebetween, inductive means connected between said supply circuit and said electronic discharge means, an auxiliary circuit connected to said inductive means comprising power absorbing means for varying the voltage impressed across said inductive means, and means for varying the power absorption of said power absorbing means in accordance with an electrical characteristic of one of said circuits.

9. In combination, a main supply circuit, a main load circuit, electronic discharge means interconnecting said circuits for transmitting energy therebetween, inductive means interposed between said supply circuit and said electronic discharge means, and an auxiliary circuit connected to said inductive means for varying the voltage thereof comprising an impedance element of substantially constant value and an energy absorbing means connected in parallel relation with said impedance element for varying the energy absorption of said energy absorbing means in accordance with an electrical characteristic of one of said main circuits.

10. In combination, an alternating current circuit, a direct current circuit, electronic discharge means connected to said direct current circuit, a circuit connected to said alternating current circuit comprising a plurality of inductive devices having primary windings and secondary windings and having a plurality of impedance elements connected in series relation with said primary windings, a transformer having primary windings connected to said secondary windings of said inductive devices and secondary windings connected to said electronic discharge means, and means connected in parallel with said impedance elements comprising a second electronic discharge means for controlling the current in said primary windings of said inductive devices.

11. In combination, an alternating current circuit, a direct current circuit, electronic discharge means connected to said direct current circuit, a circuit connected to said alternating current circuit comprising a plurality of inductive devices having primary windings and secondary windings and a plurality of inductive reactances connected in series relation with said primary windings, a transformer having primary windings connected to said secondary windings of said inductive devices and secondary windings connected to said electronic discharge means, and means connected in parallel with said inductive reactances comprising an electronic discharge means for controlling the voltage impressed on said primary windings of said transformer.

12. In combination, an alternating current circuit, a direct current circuit, an electronic discharge means connected to said direct current circuit, a circuit connected to said alternating current circuit and comprising a plurality of inductive devices having primary windings and secondary windings and a plurality of inductive reactances connected in series relation with said primary windings, a transformer having primary windings connected to said secondary windings of said inductive devices and secondary windings connected to said electronic discharge means, a second electronic discharge means connected across said inductive reactances for controlling the voltage impressed on said primary windings of said transformer and comprising a plurality of arc discharge paths having associated control members for controlling the conductivity thereof, and a control circuit for impressing on said control members periodic voltages variable in phase in accordance with a predetermined electrical condition of said alternating current circuit.

13. In combination, an alternating current circuit, a direct current circuit, an electronic discharge means, a circuit connected to said alternating current circuit including a plurality of inductive devices having primary and secondary windings and a plurality of Y-connected inductive reactances connected in series relation with said primary windings, a current responsive circuit connected to said alternating current circuit for providing an alternating voltage which varies in accordance with the current of said alternating current circuit, a transformer including one group of primary windings connected to said secondary windings of said inductive devices, a second group of primary windings connected to said current responsive circuit and a plurality of secondary windings connected to said electronic discharge means for supplying to said direct current circuit one component of unidirectional current and another component of unidirectional current which varies in accordance with the current of said alternating current circuit, and an electronic discharge device connected between said inductive reactances and said primary windings of said inductive devices to control the voltage impressed on said one group of primary windings.

14. In combination, an alternating curent circuit, a direct current circuit, an electronic discharge means connected to said direct current circuit, a circuit connected to said alternating current circuit including a plurality of inductive devices having primary windings and secondary windings and a plurality of Y-connected inductive reactances connected in series relation with said primary windings, a current responsive circuit connected to said alternating current circuit comprising a plurality of current transformers having secondary windings for providing alternating voltages which vary in accordance with the current of said alternating current circuit, means connected across the secondary windings of said current transformers for controlling the voltage thereof, a transformer including one group of primary windings connected to said secondary windings of said inductive devices, a second group of primary windings connected to said secondary windings of said current transformers and a plurality of secondary windings connected to said electronic discharge means for supplying to said direct current circuit through said electronic discharge means one component of unidirectional current and another component of unidirectional current which varies in accordance with the current of said alternating current circuit, electronic discharge means connected across said inductive reactances for periodically short circuiting said inductive reactances to control the voltage impressed on said one group of primary windings, and a control circuit for controlling the conductivity of said second mentioned electronic discharge means in accordance with a predetermined electrical condition of said alternating current circuit.

15. In combination, an alternating current circuit, a direct current circuit, an electronic discharge means connected to said direct current circuit, a circuit connected to said alternating current circuit and comprising a plurality of inductive devices having primary and secondary windings and a plurality of Y-connected inductive reactances connected in series relation with said primary windings, a transformer having primary windings connected to said secondary windings of said inductive devices and secondary windings connected to said electronic discharge means, a second electronic discharge means connected across said inductive reactances for periodically short circuiting said inductive reactances to control the current supplied to said primary windings of said inductive devices, and means for controlling said second electronic discharge means in accordance with a predetermined electrical condition of said alternating current circuit.

16. In combination, an alternating current circuit, a direct current circuit, an electronic discharge means connected to said direct current circuit, a circuit connected to said alternating current circuit including a plurality of inductive devices having primary and secondary windings and having a plurality of Y-connected inductive reactances connected in series relation with said primary windings, a transformer having primary windings connected to said secondary windings of said inductive devices and secondary windings connected to said electronic discharge means for supplying to said direct current circuit a component of unidirectional current, a second electronic discharge means connected across said inductive reactances and comprising a plurality of arc discharge paths having associated control members, and a control circuit for energizing said control members comprising means for impressing thereon periodic voltages variable in phase in accordance with a predetermined electrical condition of said alternating current circuit to short circuit periodically said inductive reactances to control the voltage impressed on said primary windings of said transformer.

KARL SCHMER.
RICHARD TROEGER.